SINGLE IMPRESSION MULTICOLOR PRINTING

Filed Feb. 10, 1972

3,758,302
SINGLE IMPRESSION MULTICOLOR PRINTING

Stephen F. Grohe, 1 Haven St.,
Boston, Mass. 02118

Filed Feb. 10, 1972, Ser. No. 225,147
Int. Cl. B41m *5/12;* G03c *7/00*
U.S. Cl. 96—2 21 Claims

ABSTRACT OF THE DISCLOSURE

This invention relates to the art of color printing wherein multi-color reproductions are made with a conventional black and white first printing plate and a second, single, multicolor printing plate. The invention is characterized, in part, by the second plate which comprises a base layer, a layer of microbeads distributed over said base layer and, in a preferred embodiment, an over-coating of a neutral density filter. The microbeads comprises a source of a color-forming material coated first with a layer of a light sensitive material and a second layer of a photographic color filter. Three distinct types of microbeads are used, one responsive to each of the three primary colors, red, yellow and blue. The printing process comprises forming separate color separation negatives in conventional manner, exposing the single, multicolor printing plate to each of the color separation negatives using the appropriate colored light and processing said plate to remove light exposed portions of the light sensitive material thereby making available red color-former from those microbeads exposed to red light, yellow color-former from those microbeads exposed to yellow light and blue color-former from those microbeads exposed to blue light. The amount of color-former made available determines the depth of color of the final print and this is in turn governed by the quality of light passing through the neutral density filter to the microbead. The printing plate so developed is then contacted with an ink which contains a second component of the color-former capable of reacting with the first component to thereby provide the primary colors red, yellow and blue in the corresponding, exposed and developed microbead. Upon contact of the first component of the color-former on the printing plate with the second component of the color-former in the ink, a color is produced in each of the developed microbeads which color is equivalent to a color dot in a conventional printing process. Consequently, a colored illusion is obtained having all of the colors and hues ready for transfer to a transfer surface.

BACKGROUND OF THE INVENTION

(1) Introduction

This invention relates in general to the art of color printing and more particularly, to those printing processes wherein multicolor reproductions are effected with a single impression.

(2) Description of the prior art

Color printing refers to the production of photoengraved or offset color plates by means of the three and four color processes.

If an area is covered with a mosaic-like pattern of dots in the three primary colors, red, yellow and blue, and is viewed from a sufficiently long distance so that the individual points cannot be separately distinguished, it appears gray. If numerous dots in two primary colors are placed side by side, they will, when viewed from a distance, appear as a mixed or compound color. This apparent merging of colors to give the appearance of another color is one of the fundamental principles of color printing.

The first step in preparing four-color printing plates from an original is to make color-separation negatives by means of color filters on a camera. A different filter is used for each color separation negative. Each filter allows only its complimentary color to pass. To make a negative for a blue printing plate, a red filter is used; for the yellow printing plate, a blue-violet filter, for the red printing plate, a green filter. A pale yellow filter is used for obtaining black values. The purpose of the black plate is to cover certain white areas of the base (i.e., the paper on which the picture is printed) and to give depth and detail to the picture in the color areas.

The negatives are developed, printed on metal and etched in much the same way as when making a monochrome half-tone plate. The plates are inked and printed in succession, each being superimposed exactly upon the other. The color picture is successively thus built up step by step. The surface of each printing plate is composed of a large number of dots, these being formed by conventional processing. Before colors from the plates are superimposed, the resulting print contains not only the four colors, but also the compound colors formed by blending of the dots.

In order to achieve high quality production in this manner, extreme care is necessary in the preparation of the plates to assure proper registration of the various colors, in the alignment of the plates and in the sequencing operation through the press. Achieving good initial registration of the various color patterns, at the very high press speeds and under the usual adverse environmental and a schedule conditions prevailing, is usually a substantial task in itself. Even though advances in the field permit a fairly precise alignment of the color pattern, typically to within 0.001 inch in some cases, the requisite registration is so sensitive that changes occurring during a press run, such as by shrinkage or expansion of the paper due to changes in humidity, for example, readily lead to discernible changes in registration, even though the initial alignment might have been accurate.

Furthermore, the necessity for close control of ink viscosity and drying rates imposes additional limitations on the system, particularly where one primary color is to be overlaid over another in the printing sequence. In some processes, two or more primary colors are blended to achieve a desired intermediate hue, the initially deposited ink being physically mixed or blended with inks subsequently overlaid in some cases. In this type of process, the first ink must remain sufficiently fluid to admix freely with the ink of the second color when the second impression is made.

In other inking operations, where an "optical blending technique" is used, the second color is layered over the first only after the first deposited ink has dried. In some cases, the second color partially bleeds into the first with a resultant non-uniformity of print rather than the crisp, color pattern intended. In any event, the press speeds and sequencing must be coordinated with the ink compositions, compatibilities and drying rates in order to obtain satisfactory results.

The use of full color techniques compatible with the usual black and white inking processes, or run of the paper color, would, of course, be a large commercial advantage to the daily newspapers which generally find it necessary to compete with other advertising media, primarily on their black and white capabilities. What is obviously still needed in the industry is a color printing system which would produce clear and faithful color reproduction by means and at speeds compatible with the normal newspaper press runs and which is economically justifiable in view of the nature of newspaper business.

From the foregoing, it is readily observable that the principal problems in run of the paper color extends from the necessity of employing separate printing plates for each color to be applied, since both the material and labor costs and the problems of precise registration of the individual impressions are related to the use of multiple plates. What is really needed is a printing system which utilizes a single plate for color application wherein only one impression is required to lay down the full color pattern. While the advantage of full color printing in a single impression has been previously recognized, as indicated by the patents to Miller, U.S. Pat. 3,213,787; Marinier et al., U.S. Pat. 2,680,533; Japanese Pat. 36/8,139; and Austrian Pat. 51,285; no such system apparently enjoys much utility in the current printing art.

STATEMENT OF THE INVENTION

The present invention overcomes the aforesaid difficulties by providing a single printing plate capable of multicolor reproduction, thus replacing the usual multiple plates currently utilized in multicolor printing. The single printing plate capable of multicolor reproduction comprises a base layer, a layer of microbeads randomly dispersed and adhered to said base layer and, in a preferred embodiment, an overcoating of a neutral density filter. The microbeads over the base layer comprise a core of a first component of a color-forming material which core is coated with a first layer of a light sensitive material and a second layer of a photographic color filter. Three distinct types of microbeads are used, one responsive to each of the three primary colors, red, yellow, and blue.

In accordance with the invention, the printing process comprises forming separate color separation negatives in conventional manner, exposing the single printing plate through each of the color separation negatives to the appropriate colored light and processing said plate to remove light exposed portions of the light sensitive material thereby making available red color-former in those microbeads passing red light, yellow color-former in those microbeads passing yellow and blue color-former in those microbeads passing blue light. The amount of color-former made available for color formation is a direct function of the intensity of a printed color and is in turn governed by the quantity of light contacting the microbead. The printing plate so processed is then contacted with an "ink" formulation containing the second component of the color former for each of the primary colors, red, yellow and blue. Upon contact of the first component of the color-former secured to the printing plate and uncovered by processing, with the second component of the color-former in the ink, colored dots are formed analogous to the colored dots in the conventional printing process but in random pattern. Thus, there is formed the colored illusion with all of the colors and hues of the original.

From the above, it can be seen that there is herein provided a printing process capable of single impression multicolor printing in perfect registration useful in high-speed presses which process is simple and economical as it avoids the costs of multiple printing plate preparation for each picture and multiplate process operation.

DESCRIPTION OF THE PREFERRED EMBODIMENTS

Figures 1, 2, 3, 4:
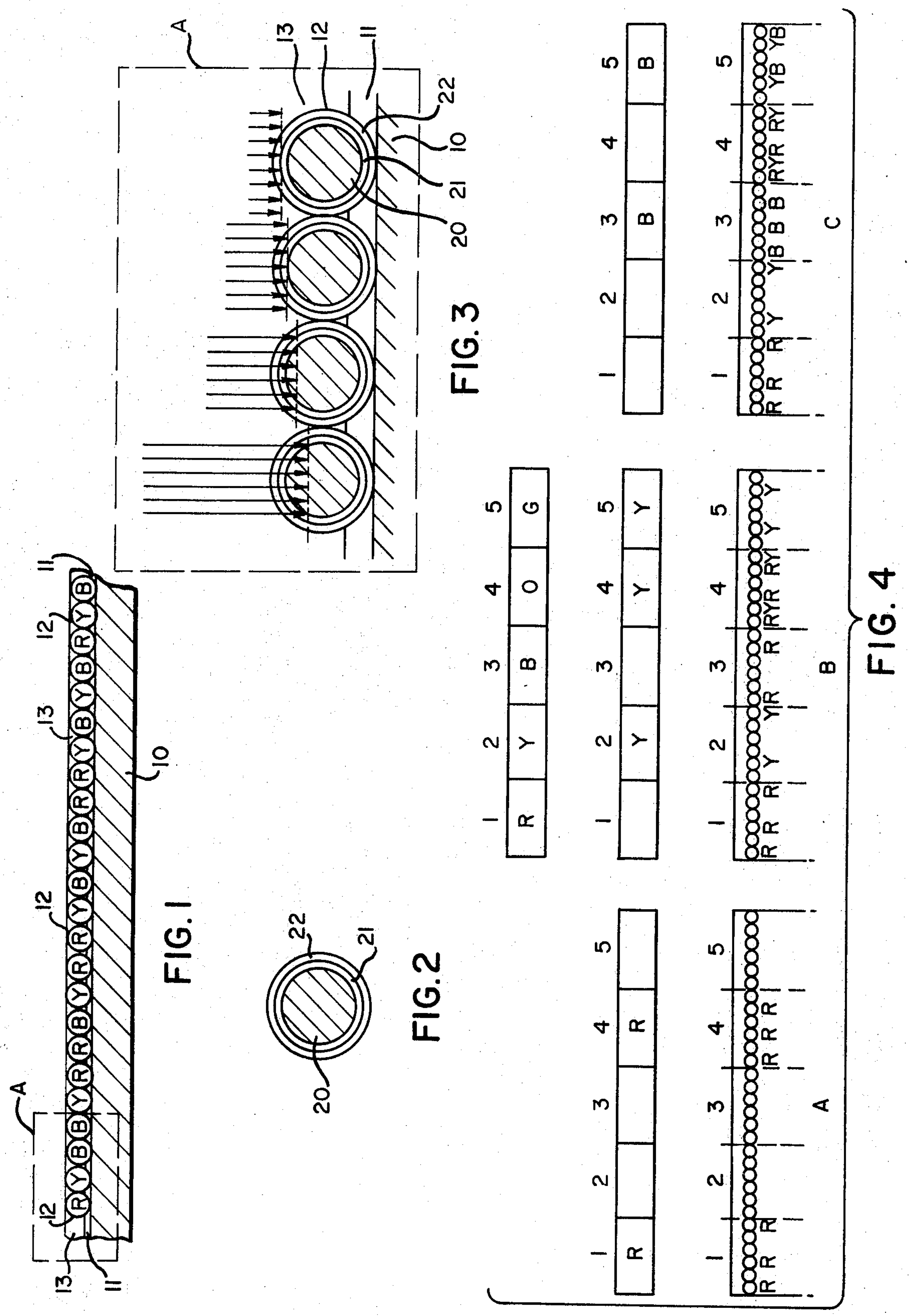
FIG. 1 represents a cross-section of a single impression printing plate in accordance with the invention.
FIG. 2 represents a microbead component of a single impression printing plate.
FIG. 3 is an enlargement of section A of FIG. 1.
FIG. 4 is a representation of a sequence for forming a latent image in the single impression printing plate of the invention.

With reference to FIG. 1 of the drawings, there is shown a base layer 10, an adhesive layer 11 over said base layer, a layer of microbeads 12 adhered to said base layer 10 through said adhesive layer 11 and, in a preferred embodiment, an additional layer of a neutral density filter 13 over said layer of microbeads.

The base layer is of any conventional material heretofore used in the art of printing plates such as a metal or plastic. The adhesive layer acting to bond the microbead layer to the base layer is not critical, any suitable adhesive not soluble in the solvent system or the processing chemicals of the printing ink being satisfactory. Typical adhesives include epoxy resins, the acrylics and the polyamides.

Adhered to the base layer is a layer of microbeads of three different forms, one form for each of the primary colors, red, yellow and blue. The three forms of microbeads are intimately admixed prior to application to the base plate so as to provide a layer having a random distribution. This distribution is illustrated in FIG. 1 of the drawings, wherein the symbols R, Y and B stand for the colors red, yellow, and blue, respectively.

With reference to FIG. 2 of the drawings, there is illustrated the structure of a typical microbead with comprises a core 20 of one component of a color-former, a layer of a light sensitive, photographic emulsion 21 and a second layer 22 of an optical filter capable of passing one of the primary colors while blocking the remaining two primary colors.

The term "component of a color-former" is defined herein as a material which will interact with a second material upon contact to form a desired color, which for purposes of this invention is one of the primary colors. In accordance with the invention, the remaining one or more components of the color former combination is to be found in the ink. Specific examples of materials suitable for the core component and ink component of the color-former as well as the method of forming a color will be discussed in greater detail below.

The layer of the light sensitive material 21 around the core of the microbead is preferably a high contrast, conventional silver halide photographic emulsion but may be of any of the light sensitive resist materials such as the diazos, cinnamic acid and the like. Details of such materials would be obvious to one skilled in the art. The optical filter layer 22 around the photographic emulsion is of a material soluble in photographic processing chemicals and containing a dye that permits transmission of light of the desired wave length. Thus, for example, for a microbead having a core of a blue color-former, the dye would be red; for a microbead having a core of a yellow color-former, a blue-violet dye would be used as an optical filter, and for a microbead having a core of a red color-former, a green dye would be used. Gelatin is the preferred material for the optical filter layer 22 as it is soluble in the photographic processing chemicals.

The microbeads are prepared in accordance with standard prior art encapsulation procedures such as using spray drying techniques, emulsion techniques, spinning techniques and the like. Because there are two coatings over the core of the microbead, two coating applications will be necessary. The size of the mircobead would be in accordance with conventional microencapsulation procedures, typically having a diameter ranging between 1 and 200 microns for most applications though in some cases, larger microbeads may be desirable.

Overcoating the microbead layer, there is preferably a layer of a neutral density filter 13 (FIG. 1 of the drawing), especially where high fidelity of the final printed image is necessary. The relationship of the neutral density filter to the microbead is better illustrated in FIG. 3 of the drawing which is an enlargement of the enclosed Section A of FIG. 1. From the drawing, it can be seen that the neutral density filter layer 13 is of a thickness approximating the diameter of the microbeads 12 so that the top of the microbead is either exposed or covered with a very thin layer of the filter material. The neutral density filter regulates the depth of penetration of the light into the filter material and the light sensitive material of the microbead as the light is attenuated as it passes through this filter. Thus, the depth of penetration into the neutral density filter is a direct function of the quantity of light striking the printing plate in any given area. Since the microbead is circular with a radius of curvature downward away from the top surface of the printing plate, the greater the depth of penetration of the light into the filter and the light sensitive material, the greater will be the surface area of a bead exposed by the light and the larger will be the dot after processing of the plate.

With further reference to FIG. 3, the arrows in FIG. 3 represent light exposure and the length of the arrows represents the quantity of light striking the plate. It can be seen that the greatest quantity of light (longest arrows) penetrates most deeply into the neutral density layer exposing the largest portion of the microbead so contacted. The least quantity of light (the shortest arrows), penetrates only slightly into the neutral density filter exposing only a small portion of the microbead, insufficient to expose any of the color-former core material. An intermediate quantity of light penetrates the microbead to an intermediate depth, thus exposing some, but not all of the microbead.

Following exposure, the exposed printing plate is processed with a conventional developer. For a silver halide emulsion a high contrast or "litho" photographic developer is used. The neutral density filter and exposed and developed portions of the microbeads are removed, thus uncovering the the core color-former material of the microbead. The amount of this care material exposed, i.e., its surface area, controls the intensity of the colored image; greater amounts of color-former providing larger areas of color upon contact with "ink" containing the second component of the color-former.

The neutral density filter material is well known in the art and typically comprises gelatin containing a gray coloring matter.

With regard to materials of the components of the color-former combination, as noted above, one component comprises the core of the microbead and the other component is contained in the ink. Following exposure through the color separation negatives, as will be discussed in greater detail below, and development of the printing plate, the plate is inked and the contact of the color-former component in an exposed microbead with the component contained in the ink provides colored dots analogous to the colored dots in conventional printing processes.

Any color-former combination can be used in the process of the invention provided that one component thereof can be reduced to a sufficiently small particle size in the dry state and the other component can be put into a liquid and dispersed in an ink and provided further, that the combination will form a colored image of good quality of subsequent interaction with each other.

A suitable class of materials for use as a core material in the microbead, for example, includes the leuco forms of suitable dyestuffs which are subsequently converted into a colored form by reacting with an oxidizing agent. Alternatively, dye intermediates in the form of diazonium compounds may be used which materials are reacted with another intermediate that has a chemical group reactive with the diazonium compounds to produce the desired color. A preferred class of color-formers that are advantageously used are the colorless coupler compounds known in the photographic arts. Examples of such materials are the phenolic and naphtholic coupler compounds used in the art of color photography which react with an oxidized primary aromatic amine to form a blue image. Similarly, the well-known pyrazoline red color-formers and benzoyl acetanilide yellow forming couplers are used advantageously in the preparation of red and yellow dye images, respectively. Representative of the most preferred color couplers of this type useful in the process of the invention are the following examples.

| Coupler: | Name |
|---|---|
| 1 | 1-hydroxy-N-(2-N-methylpyridinium)-2-naphthamide p-toluenesulfonate. |
| 2 | 1-hydroxy-N-[3-(N,N,N-trimethylaminopropyl)]-2-naphthamide iodine. |
| 3 | 2,4-dichloro-5-(p-toluene sulfonamino)-1-napthol. |
| 4 | 1-hydroxy-N-[2-methoxy-5-(3,5-dicarboxyphenyl)-carbamylphenyl]-2-naphthamide. |
| 5 | 1-hydroxy-2-cetylnaphthamide. |
| 6 | 1-hydroxy-4'-(2,4-di-tert-amylphenoxy)-2-naphthanilide. |
| 7 | 5-methyl-2-(3,5-disulfobenzamido)phenyl barium salt. |
| 8 | 2-(2,4-di-tert-amylphenoxy)acetamino-1,5-dichloro-5-methylphenol. |
| 9 | 1-[p-(p'-tert-butylphenoxy)-phenyl]-3-[a-(p-tert-butylphenoxy)-propionylamino]-5-pyrazolone. |
| 10 | 1-(2',4',6'-trichlorophenyl)-2-[3''-(2'',4''-di-tert-amylphenoxyacetamido)-benzamidol-5-pyrazolone. |
| 11 | 1-phenyl-3-(m-nitrobenzoylamino)-5-pyrazolone. |
| 12 | 1-phenyl-3-(3,5-disulfobenzamido)-5-pyrazolone di-potassium salt. |
| 13 | 1-(3,5-dicarboxyphenyl)-3-amino-5-pyrazolone. |
| 14 | 3-methyl-1-phenyl-5-pyrazolone. |
| 15 | 3-hexadecyl-1-phenyl-5-pyrazolone. |
| 16 | 2-cyabiacetylcoumarin. |
| 17 | N-(p-benzoylacetaminobenzenesulphonyl)-N-($\gamma$-phenylpropyl)-p-toluidine. |
| 18 | $\alpha$-[3-$\alpha$-(2,4-di-tert-amylphenoxy)-acetamido-benzoyl]-2-methoxyacetanilide. |
| 19 | 4-(p-toluenesulfonamino)-$\omega$-benzoylacetanilide. |
| 20 | 2-methoxybenzoylacetanilide. |
| 21 | Benzoylacetanilide. |

Some of the couplers which are useful in the invention are of the diffusing type while others are of the nondiffusing type. For example, cyan-forming couplers 1, 2, 3, 4, and 7 illustrates the diffusing type while couplers 5, 6, and 8 illustrate the nondiffusing type cyan coupler. Couplers 19, 20 and 21 illustrate the diffusing yellow type coupler while coupler 13 represents the nondiffusing type. Couplers 11, 12, 13, 14 and 16 illustrate diffusing type magenta couplers and couplers 9, 10 and 15 illustrate nondiffusing couplers.

Most of the couplers of the invention have been described earlier in the prior art. The p-toluene sulfonate salt of coupler 2 is described in Whitmore et al., U.S. Pat. 2,940,849. Coupler 3 is described in Vittum et al. U.S. Pat. 2,362,598. Coupler 5 was prepared by condensing a-hydroxynaphthoic acid chloride with hexadecylamine. Coupler 6 was prepared as described in column 6, lines 47 through 53, of Glass et al., U.S. Pat. 2,521,908. Coupler 7 is the barium salt of the parent of Coupler XIX of Whitmore et al., U.S. Ser. No. 734,141, filed May 9, 1958, now abandoned. Coupler 8 was prepared as described in columns 3 and 4 of Graham, U.S. 2,725,291. Coupler 9 is described as Example 47 in Porter et al., U.S. 2,369,489. Coupler 10 is described as coupler 7 in Loria et al., U.S. 2,600,788. Coupler 11 is described as coupler 17 in Porter et al., U.S. 2,369,489. Coupler 12 is described in aforementioned Whitmore et al., U.S. Ser. No. 734,141, filed May 9, 1958. Coupler 14 is the parent coupler of coupler (2) described in column 4 of Jelley et al., U.S. 2,434,272. Coupler 15 was prepared in a manner similar to that used for coupler 14. Coupler 16 is the parent coupler for coupler (4) in column 2 of Jelley et al., U.S. 2,434,272. Coupler 17 is described as coupler 47 in Weissberger, U.S. Pat. 2,298,-443. Coupler 18 is described as coupler IV in McCrossen et al., U.S. Pat. 2,875,057. Coupler 19 is described in Vittum et al., U.S. Pat. 2,71,238. Coupler 20 is described as coupler 1 in Weissberger U.S. 2,407,210.

As noted above, the aforesaid coupler compounds are turned into a visible, colored image by contact with a suitable oxidized primary aromatic amine. With this embodiment of the invention, the oxidizing agent and the amine are dispersed in a suitable carrier medium which carrier has the requisite viscosity property for inking. Suitable oxidizing agents must have sufficient oxidizing potential to oxidize the primary aromatic amine used and must not form a colored reduction product. Among the suitable inorganic oxidizing agents used are potassium persulphate, sodium persulphate, potassium perchlorate, sodium perchlorate, potassium periodate, sodium periodate, potassium ferricyanide, sodium ferricyanide, etc.; and organic oxidizing agents such as certain quinones.

Any prior art primary aromatic amines used in conventional photographic color developers can be used to develop the coupler images. Included among these are the p-phenylene diamines, the p-aminophenols having at least one primary amino group, 2-amino-5-diethyleneaminotoluene, N-ethyl-N-beta-methanesulfonamidoethyl-3-methyl-4-aminoaniline sulphate or sesquisulfate monohydrate, N-ethyl-N - beta-methanesulfonaminoethyl - 4-aminoaniline, 4-(N-ethyl-N-beta-hydroxyethyl) aminoaniline, 4-amino-N,N-diethylaniline, etc. The concentrations of the amine in the ink composition preferably varies from about 0.1 to 10 grams per liter of the ink while the oxidizing agent is used in amount sufficient to oxidize said amine.

A most preferred color-forming combination for purposes of this invention would comprise metal particles or their salts in combination with a suitable complexing agent therefore to form a desired color. The complexing agent used must react differently with each metal to form a different color or alternatively, a combination of complexing agents may be used, each of the complexing agents reacting with one of the three metals without interference from the remaining complexing agents. The metal or salt thereof would comprise the core of the microbead and the complexing agent component would be contained in the ink. A most preferred system would be salts of iron, cobalt and bismuth, e.g., oxides, acetates, chlorides or the like. The complexing agent would be thiocyanate which reacts with iron to form a red coloration which absorbs at about 500 millimicrons, cobalt to provide a blue coloration which absorbs at about 959 millimicrons and bismuth to provide a yellow coloration which absorbs at about 140 millimicrons.

An alternative system would comprise a core material of a dye in particulate form and an ink comprising a relatively poor solvent for the dye.

The manner of obtaining colored prints from a single plate, disregarding a second black plate, is better illustrated in FIG. 4 of the drawings. In FIG. 4, there is illustrated on the top line a colored original to be printed. The colored original, for purposes of illustration, is divided into five numbered slots. Each slot has a letter representing a different color, R representing red, Y representing yellow, B representing blue, O representing orange and G representing green. On line 2 of the drawing, the colored original has been broken into three color separation negatives. At station A, there is represented the color separation negatives for red having the capability of passing red light in slots 1 and 4, the capability in slots 4 being due to breaking the orange into its components, one of which being red. At station B, there is represented the color separation negative for yellow which has the capability of passing yellow light in slots 2, 4 and 5, the yellow passing slot 4 as one component of the orange, and the yellow of slot 5 being one component of the green. At station C, there is the color separation negative for blue, there being the capability of passing blue light in slot 3 and in slot 5, yellow being one component of green. One line 3 of FIG. 4, the single impression printing plate is placed at station A and exposed through the separation negative for red with red light exposing microbeads having a core of a red color former. Red passes the color separation negative at slots 1 and 4. The single impression plate then passes to station B wherein it is exposed through the color separation negative for yellow wherein microbeads having a yellow-color former core are exposed at slots 2, 4 and 5. Finally, the single impression printing plate is passed to station C where it is exposed through the color separation negative for blue wherein those microbeads having a core of a blue-former are exposed at slots 3 and 5.

The so exposed single impression printing plate is then developed using standard photographic techniques. A silver halide image is formed by contact with a typical litho line developer. Thereafter, the image is fixed with a non-hardening fixer. Finally, the plate is etched with a conventional etchant to remove gelatin and silver leaving behind the unexposed materials and uncovering core color-former material. With reference to FIG. 4, using slot 1 for purposes of illustration, those microbeads having a red color-former will have been affected by development while the remaining microbeads, those having the yellow and blue color-former core remains virtually intact.

The single impression printing plate, so developed, is then contacted with the ink containing the second component of the color-former. In slot 1, contact of the ink with the red color-former will produce red dots which will give the visual impression of a red coloration. Contact of the ink with the microbeads in slot 2 will provide a series of yellow dots giving a yellow impression. In slot 3, contact with the ink will provide blue dots providing an illusion of a blue coloration. In slot 4, both red and yellow dots are produced which, when viewed from a distance, analogous to the color dots in conventional printing processes, will give the illusion of orange. In slots 5, yellow and blue dots are formed which when viewed from a distance will give the illusion of green.

Transfer of the so developed colored image to a surface is in accordance with conventional printing processes though the use of one plate for multi-color reproduction is a substantial cost savings.

It should be understood that the invention described herein may be modified without departing from the scope of the appended claims. For example, the single impression plate may be used as a plate in a camera (with suitable reversal processing) thereby avoiding the need for the color separation procedures entirely. It is also conceivable that the single impression plate could be useful with "color negative" monopack materials such as Ektacolor.

What is claimed is:

1. A microbead comprising a core material of a color former which will interact with a second material to form a primary color, a layer of a light sensitive silver halide emulsion around said core material and a layer of a color filter around said light sensitive material.

2. The microbead of claim 1 having a mean diameter of from 1 to 200 microns.

3. The microbead of claim 1 where the silver halide emulsion is a high contrast silver halide emulsion.

4. The microbead of claim 1 where the color filter is gelatin containing a dye.

5. The microbead of claim 4 where the dye is selected from the group consisting of red dyes, blue-violet dyes and green dyes.

6. The microbead of claim 1 where the core-material is solid.

7. The microbead of claim 1 where the core-material is selected from the group of dyes, dye intermediates and metal or metal salt powders.

8. The microbead of claim 7 where the core-material is a particle of metal or a metal salt.

9. A microbead comprising a core material selected from the group of iron, cobalt and bismuth and their metal salts, a layer of a light sensitive silver halide emulsion around said core material and a layer of a color filter around said light sensitive material, said color filter comprising gelatin containing a dye.

10. A single impression, multi-color printing plate comprising a substrate and a layer of microbeads adhered to said substrate, there being three different types of microbeads, one for each of the primary colors red, yellow and blue, each of said microbeads comprising a core of a component of a color-former which will interact with a second material to form a primary color, a layer of a light sensitive silver halide emulsion around said core and a layer of a color filter around said light sensitive material, said microbeads being admixed so as to be in a random distribution over said substrate.

11. A single impression, multi-color printing plate comprising a substrate and a layer of microbeads adhered to said substrate, there being three different types of microbeads, one for each of the primary colors red, yellow and blue, each of said microbeads comprising a core of a component of a color former which will interact with a second material to form a primary color, a layer of a light sensitive material around the core and a layer of a color filter around said light sensitive material, said microbeads being admixed so as to be in a random distribution over said substrate, said printing plate having a layer of a neutral density filter over said layer of microbeads.

12. The printing plate of claim 11 where said light sensitive material is a silver halide emulsion.

13. The printing plate of claim 12 where said microbeads have a mean diameter of from 1 to 200 microns.

14. The printing plate of claim 12 where said light sensitive material is a silver halide emulsion.

15. The printing plate of claim 14 where said color filter is gelatin containing a dye selected from the group of red dyes, blue-violet dyes and green dyes.

16. The printing plate of claim 14 where the core material of the microbeads is solid and selected from the group of dyes, dye intermediates, metal powders and metal salts.

17. The printing plate of claim 16 where the core material is selected from the group of iron, cobalt and bismuth as metals or salts.

18. The printing plate of claim 14 where the thickness of the neutral density filter is about the same as the mean diameter of the microbeads.

19. The printing plate of claim 14 where the neutral density filter is grey gelatin.

20. A printing process comprising exposing the printing plate of claim 14 through color separation negatives, processing said printing plate with a developer for said silver halide emulsion, a non-hardening fixing agent and an etchant that dissolves said neutral density filter, said color filter and said light exposed silver halide emulsion, contacting said developed plate with an ink containing a second component of a color-former capable of interacting with said core of said microbeads to form a primary color and transferring said image to a transfer sheet.

21. The process of claim 20 where said ink contains a thiocyanate and said core material is iron, cobalt and bismuth.

References Cited

UNITED STATES PATENTS

| | | | |
|---|---|---|---|
| 1,991,136 | 2/1935 | Capstaff | 96—74 X |
| 2,284,877 | 6/1942 | Martinez | 96—74 X |
| 2,304,940 | 12/1942 | Mannes et al. | 96—74 X |
| 2,940,847 | 6/1960 | Kaprelian | 96—1.2 |
| 3,276,869 | 10/1966 | McCune, Jr. | 96—3 |
| 3,396,026 | 8/1968 | Taylor | 96—94 |
| 3,443,948 | 5/1969 | Bryan | 96—67 |

NORMAN G. TORCHIN, Primary Examiner

A. T. SURO PICO, Assistant Examiner

U.S. Cl. X.R.

96—84 R; 101—135, 469